United States Patent [19]

Osaki

[11] Patent Number: 4,985,977
[45] Date of Patent: Jan. 22, 1991

[54] METHOD OF AND APPARATUS FOR APPLYING TOP END STOPS ON TO A SLIDE FASTENER CHAIN

[75] Inventor: Tatsuo Osaki, Uozu, Japan

[73] Assignee: Yoshida Kogyo K. K., Tokyo, Japan

[21] Appl. No.: 514,931

[22] Filed: Apr. 26, 1990

[30] Foreign Application Priority Data

May 1, 1989 [JP] Japan ................................. 1-113108

[51] Int. Cl.$^5$ .............................................. B29D 5/00
[52] U.S. Cl. ....................................... 29/408; 29/707; 29/767; 29/33.2
[58] Field of Search .................. 29/408, 707, 766, 767, 29/33.2

[56] References Cited

U.S. PATENT DOCUMENTS

| | | | |
|---|---|---|---|
| 4,369,560 | 1/1983 | Ueda | 29/408 |
| 4,516,304 | 5/1985 | Yoshida et al. | 29/766 |
| 4,839,956 | 6/1989 | Osaki | 29/408 |
| 4,862,585 | 9/1989 | Morita | 29/767 |

Primary Examiner—P. W. Echols
Attorney, Agent, or Firm—Hill, Van Santen, Steadman & Simpson

[57] ABSTRACT

A method of applying top end stops on to a slide fastener chain comprises holding a top end stop or stops in between an anvil and a horn, moving the anvil and the horn together into alignment with a path of travel of the fastener chain, threading the fastener chain through the top end stop, clamping and attaching the top end stop by fusion to the fastener chain, and moving the anvil and the horn out of the path of the fastener chain. This method is reduced to practice by an apparatus which essentially comprises an anvil and a horn which are vertically movable together in one instance toward and away from a horizontal path of the fastener chain and means of moving the anvil independently from and against the horn in another instance to clamp and attach the top end stop to the fastener chain.

6 Claims, 6 Drawing Sheets

METHOD OF AND APPARATUS FOR APPLYING TOP END STOPS ON TO A SLIDE FASTENER CHAIN

BACKGROUND OF THE INVENTION

1. Field of the Invention

This invention relates to a method of and an apparatus for applying top end stops to a slide fastener chain of continuous length. More particularly, the invention is directed to such a method and apparatus which is employed during a substantially continuous cycle of operation in which the slide fastener chain is attached with bottom end stops, threaded with sliders, attached with top end stops and finally cut to individual product lengths.

2. Prior Art

The present inventor has previously proposed a technology of applying top end stops to a slide fastener chain as disclosed in U.S. Pat. No. 4,839,956, in which a pair of opposed stringer tapes are spread apart under tension along their respective inner longitudinal edges and inserted, upon release of the spreading tension, through the respective U-shaped top end stops of a plastics material which are received in correspondingly shaped pockets defined between a clamping jaw and an anvil, and the top end stops are secured to the stringer tapes by means of ultrasonic or high-frequency energy after the clamping jaw has been retracted away from the anvil. This prior technology however involves a mono-functional apparatus which is not suitable, if not impossible, for employment in the aforesaid continuous cycle of slide fastener finishing operation. It would be possible to thread a pair of stringer tapes at their leading ends through the U-shaped top end stops which are clamped between the jaw and the anvil, but the tendency is that the threading force or sliding resistance of the stringer tapes causes the end stops to become shifted out of the correct position on the anvil particularly when the jaw is separated from the clamping jaw, resulting in defective or inoperative top end stops on the stringer tapes.

SUMMARY OF THE INVENTION

It is therefore the primary object of the present invention to eliminate the foregoing difficulties of the prior art by providing a method of applying top end stops on to a slide fastener chain which ensures stable and firm attachment of a top end stop to a predetermined end portion of the fastener chain.

Another object of the invention is to provide an apparatus for carrying the above method into practice which is simple in construction and reliable in operation.

According to the invention, there is provided a method of applying top end stops onto a slide fastener chain of continuous length which comprises the steps of (a) forming a top end stop of substantially U-shaped cross-section from an elongate strip of thermoplastic resin, (b) receiving and holding the top end stop in between an anvil and a supersonic or high frequency energy applying horn, (c) transporting a slide fastener chain along a horizontal path of travel, (d) moving the anvil and the horn together into alignment with the horizontal path, (e) threading the fastener chain through the top end stop, (f) moving the anvil against the horn to clamp the top end stop therebetween, (g) attaching the top end stop by fusion to a portion of the fastener chain, (h) separating the anvil from the horn and removing the portion of the fastener chain from the anvil for delivery out of the horizontal path, and (i) moving the anvil and the horn together out of the horizontal path.

The invention will be better understood from the following description taken in conjunction with the accompanying drawings.

DETAILED DESCRIPTION OF THE INVENTION

Figure 1:
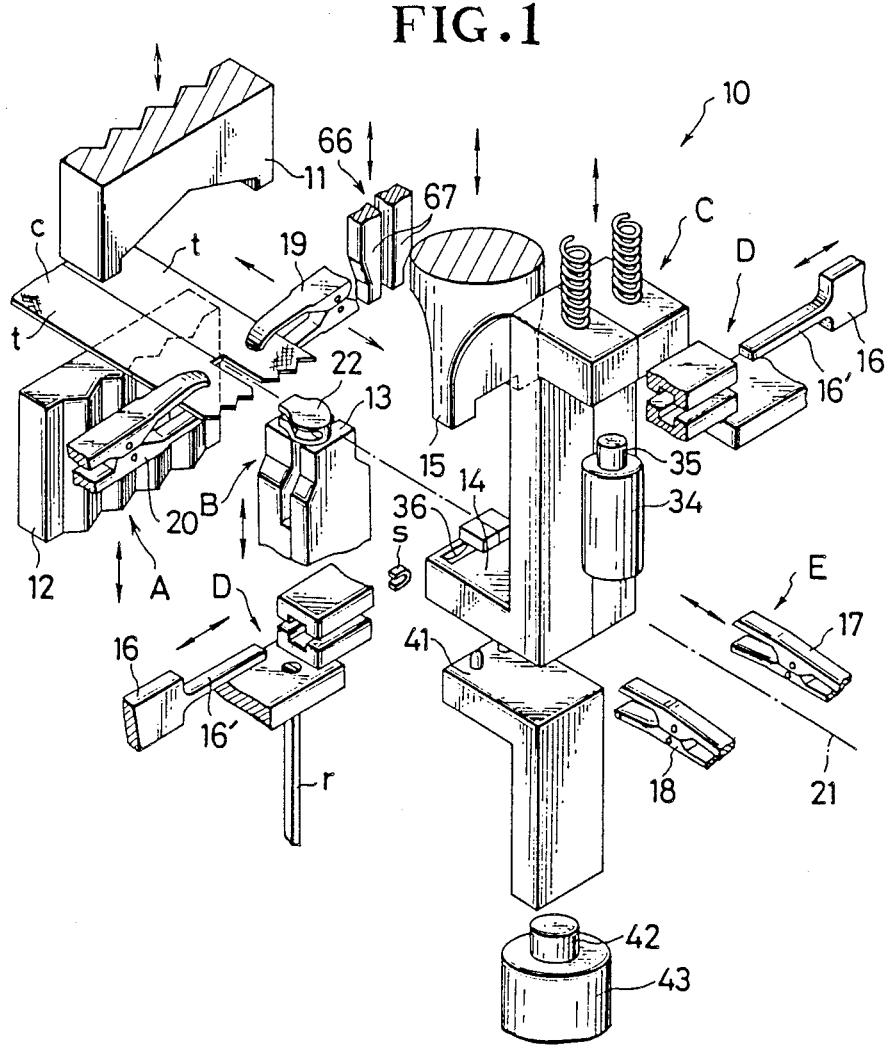
FIG. 1 is an exploded perspective view of an apparatus embodying the invention for applying top end stops to a slide fastener chain.

Referring now to the drawings and FIG. 1 in particular, there is shown an apparatus 10 for applying top end stops s one pair at a time onto respective leading ends of a pair of stringer tapes t, t constituting part of a continuous length slide fastener chain c.

The apparatus 10 generally comprises a cutting unit A including coacting cutters 11, 12, a slider mounting unit B including a slider holder 13, a top end stop applying unit C including an anvil 14 and a horn 15, a top end stop forming unit D including a plunger 16 and a slide fastener delivery unit E including a pair of grippers 17, 18.

The slide fastener chain c prior to entry into the apparatus 10 has been provided at predetermined intervals with bottom end stops (not shown) in a manner well known in the art. It comprises a pair of opposed stringer tapes t, t, each carrying a row of coupling elements (not shown) along their respective inner longitudinal edges. The stringer tapes t, t of the fastener chain c are cut by the coacting cutters 11, 12 which are movable toward and away from each other in a plane perpendicular to the general plane of the fastener chain c and gripped adjacent the thus cut ends by a pair of feed grippers 19, 20 disposed on opposite sides of the stringer tapes t, t, and reciprocably movable horizontally in alignment with a horizontal path of travel 21 of the fastener chain c.

The feed grippers 19, 20 hold and move the fastener chain c past the slider holder 13, whereupon a slider 22 placed on the slider holder 13 is threaded through the chain c in a manner well known in the art. The fastener chain c continues to move along the horizontal path 21 until its leading end arrives at the top end stop applying unit C.

Figure 2:
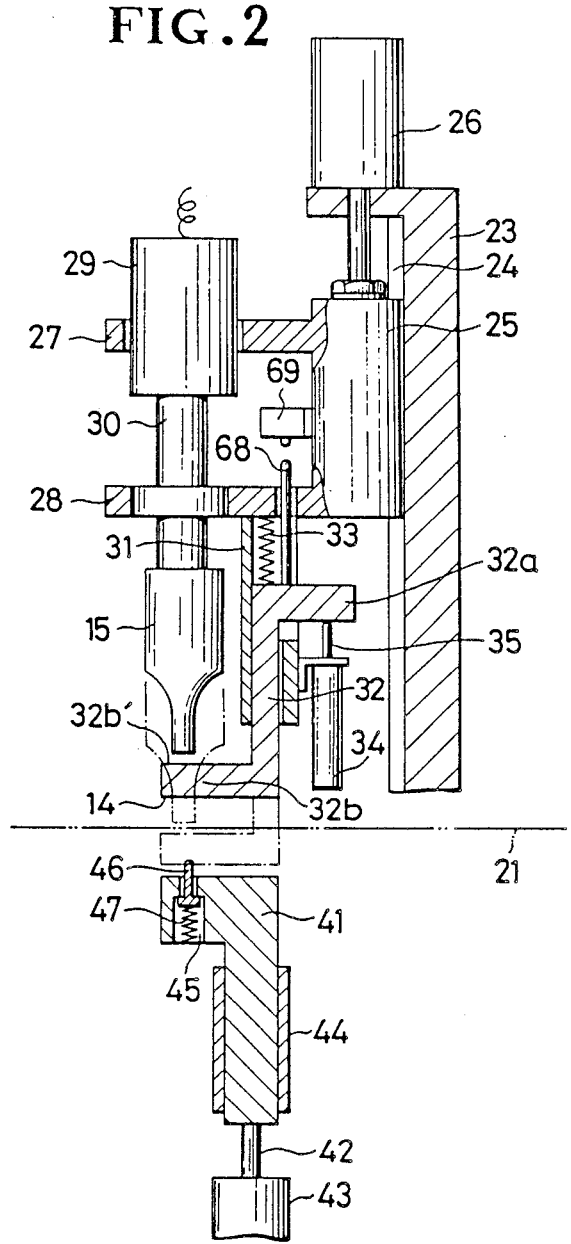
FIG. 2 is an elevational, partly sectional view, of a portion of the apparatus shown in FIG. 1.

The top end stop applying unit C, as better shown in FIG. 2, comprises a vertically disposed support frame 23 having a vertically extending guide rail 24 and a sliding carrier 25 connected at one of its ends to and driven by a first hydraulic or pneumatic cylinder 26 to move reciprocably along the guide rail 24. A pair of upper and lower arms 27, 28 extend horizontally from the sliding carrier 25. To the upper arm 27 is secured a supersonic converter 29 which is connected to one end of a booster 30 extending vertically through the lower arm 28. A supersonic or high frequency energy applying horn 15 is secured to the opposite end of the booster 30.

A cylindrical guide 31 extends vertically from the lower arm 28 of the sliding carrier 25. An anvil holder 32 is accommodated in and slidably engaged with the cylindrical guide 31 and has at one end a first horizontal arm 32a directed toward the sliding carrier 25 and at the opposite end a second horizontal arm 32b directed toward and extending immediately under and in confronting relation to the horn 15. The second horizontal arm 32b thus serves at the anvil 14 cooperating with the horn 15 in affixing the top end stops s to the stringer tapes t, t in a manner hereafter to be described.

A compression spring 33 is interposed between the anvil holder 32 and the lower arm 28 of the sliding carrier 25 and adapted to normally bias the anvil holder 32 toward the horizontal path 21 of the fastener chain c.

A second hydraulic or pneumatic cylinder 34 is connected to the cylindrical guide 31 with its piston rod 35 held in abutting engagement with the first horizontal arm 32a of the anvil holder 32, the arrangement being that a stroke of the piston rod 35 of the second cylinder 34 limits the downward movement of the anvil holder 32 and defines the clearance between the top end of the horn 15 and an upper surface 32b' of the second arm 32b (anvil 14).

Actuation of the first cylinder 26 causes the sliding carrier 25, hence the horn 15 and the anvil 14 to move together upwardly or downwardly. Actuation of the second cylinder 34 causes the anvil 14 alone to move up or down independently from the horn 15 for a purpose later described.

Figure 10:
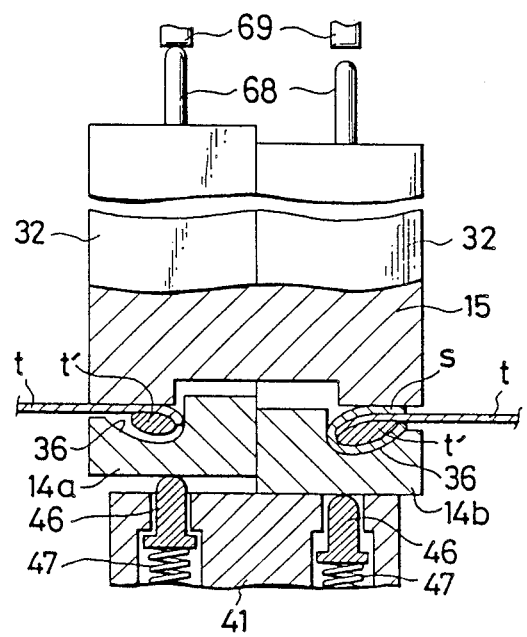
FIG. 10 is a view similar to FIG. 6 but showing a sensor means operatively associated with the apparatus of FIG. 1.

The anvil 14 consists of identical halves 14a, 14b which are vertically movable relative to each other as shown in FIG. 10. The anvil 14 is provided in its upper surface, as better shown in FIGS. 5-8, with a pair of pockets 36 for receiving therein top end stops s, the pockets 36 having a depth progressively increasing toward a central portion 37 of the anvil 14 which is slightly higher in level than side portions 38 of the anvil 14.

The horn 15 is provided, as also better shown in FIGS. 5-8, with a pair of downwardly projecting side flanges 39 defining therebetween a recess 40 disposed in confronting relation to and dimensioned to receive the central portion 37 of the anvil 14.

A clamping ram 41 is located below the level of the horizontal path 21 in confronting relation to the anvil 14 and has its lower end connected to a piston rod 42 of a third drive cylinder 43 which drives the ram 41 to move vertically through a guide sleeve 44. The clamping ram 41 is provided at its upper end with a vertically elongated slot 45 accommodating a knock pin 46 which is biased by a spring 47 normally upwardly toward the anvil 14.

Figure 3:
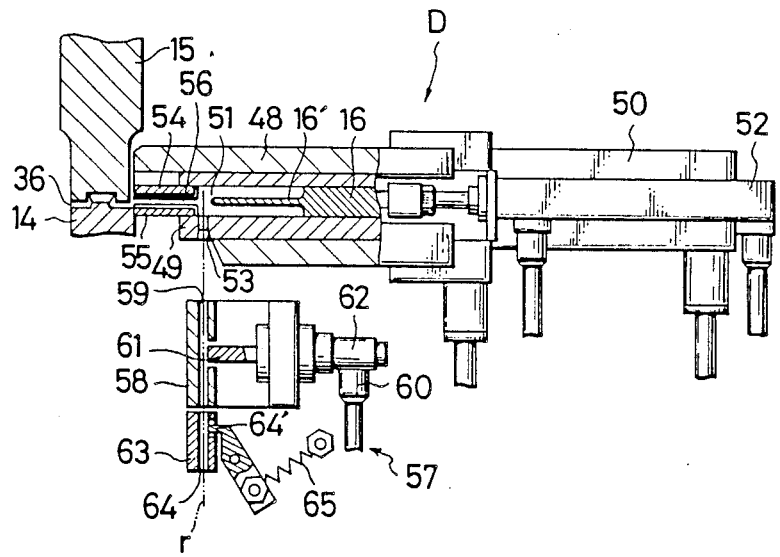
FIG. 3 is an elevational, partly sectional view, of another portion of the apparatus of FIG. 1.
Figure 4:
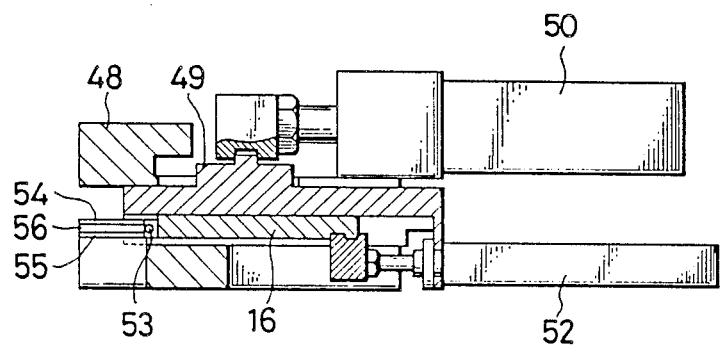
FIG. 4 is a plan view of the portion of the apparatus shown in FIG. 3.
Figure 5:
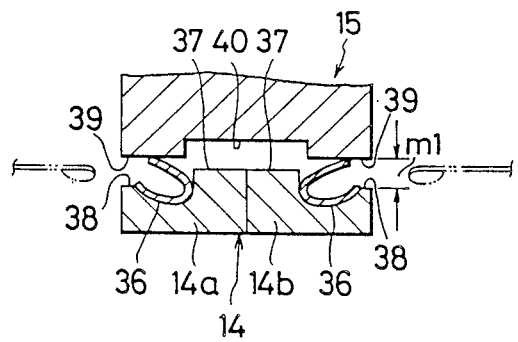
FIGS. 5-8 inclusive are diagrammatic sectional views utilized to explain the sequence of applying a pair of top end stops on to respective stringer tapes.

The top end stop s to be applied to the slide fastener chain c according to the invention is formed from an elongate strip of thermoplastic resin r into a cross-sectionally U-shaped element by means diagrammatically illustrated at D in FIG. 1 and structurally shown in FIGS. 3 and 4. The top end stop forming unit D is provided in a pair on opposite sides of the anvil 14 and the horn 15, and each comprises a casing 48 and a slide member 49 movable reciprocably within the casing 48 toward and away from the anvil 14 by means of a fourth drive cylinder 50. The slide member 49 has an elongated horizontal bore 51 accommodating a plunger 16 with a head 16' reciprocably movable therein in the direction of the anvil 14 by means of a fifth drive cylinder 52 and also has a vertical slit 53 adjacent to an end of the slide member 49 remote from the fourth cylinder 50 and communicating with the horizontal bore 51. Mounted within the casing 48 adjacent an end thereof confronting the anvil 14 are a pair of upper mold 54 and lower mold 55 defining therebetween a horizontal cavity 56 communicating with the horizontal bore 51 in registry with the horizontal path 21 and dimensioned to receive the plunger head 16'.

The top end stop forming strip r is fed vertically upwardly through the slit 53 into the bore 51 of the slide member 49 by means of a feeder 57 as shown in FIG. 3. The feeder 57 comprises a guide member 58 having a vertical slit 59 disposed in alignment with the vertical slit 53 in the slide member 49 for feeding the strip r to the top end stop forming unit D. The guide member 58 is reciprocably movable toward and away from the forming unit D by means of a sixth drive cylinder 60. The strip r is retained stably in place within the guide slit 59 by means of a finger 61 actuated by a seventh drive cylinder 62. Designated at 63 is a guide block having a slit 64 extending in alignment with the guide slit 59 and accommodating the strip r stably therein by means of a finger 64' which is normally urged by a spring 65 toward the strip r.

The slide member 49 moves together with the plunger 16 a predetermined distance toward the anvil 14 until the strip r within the bore 51 is cut to a predetermined length by a cutting means formed by the junction between the lower marginal edge of the lower mold 55 and the peripheral marginal edge of the guide slit 59. The slide member 49 stops alone at that point, while the plunger 16 continues to move and cooperates with the molds 54, 55 in forming the thus cut piece of strip r into a U-shaped top end stop s. The top end stop s is then inserted into the pocket 36 of the anvil 14 which has descended together with the horn 15 to a position shown in FIG. 5 in which the anvil 14 and the horn 15 define therebetween a clearance $m_1$ for holding the top end stop s in alignment with the horizontal path 21 of the fastener chain c.

Figure 6:
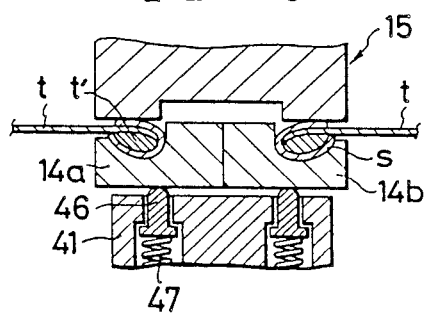
Figure 7:
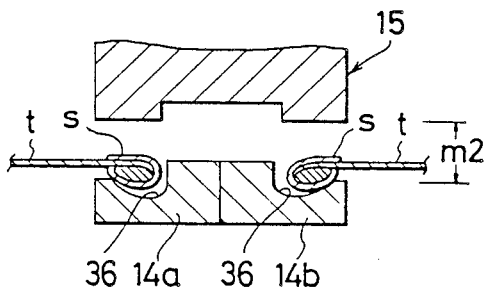
Figure 8:
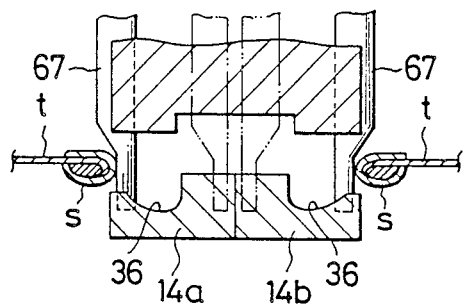
Figure 9:
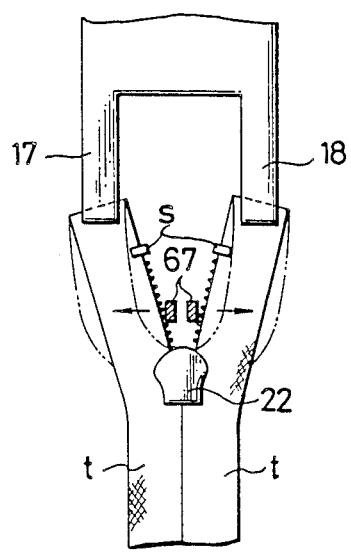
FIG. 9 is a plan view corresponding to the view of FIG. 8.

The top end stop applying unit C now stands by for the arrival of the slide fastener chain c whose leading end is gripped and advanced by a pair of feed grippers 19, 20 past the slider mounting unit B. The pair of stringer tapes t, t upon passage through the slider mounting unit B are spread apart by a separator 66 having a pair of vertical arms 67 movable both vertically and horizontally toward and away from each other. The stringer tapes t, t are thus spread apart with their respective beaded inner edges t', t' held in alignment with the respective pockets 36 of the anvil 14 and threaded through the top end stops s held between the anvil 14 and the horn 15, whereupon the clamping ram 41 ascends and moves the anvil 14 upwardly closer to the horn 15 against the tension of the spring 33 as shown in FIG. 6 so that the top end stop s is clamped against and secured to the beaded edge t' of each stringer tape t by means of supersonic or high frequency energy applied by the horn 15 which causes the material of the top end stop s to bond by fusion at its inner peripheral surface to the tape beaded edge t'. Upon completion of the top end stop applying operation, the clamping ram 41 descends or retreats away from the anvil 14 so that the anvil 14 is allowed to descend with downward stroke of the second cylinder 34 to a position shown in FIG. 7 in which the anvil 14 is separated from the horn 15 by a greater clearance $m_2$. The separator 66 is brought down into engagement with the stringer tapes t, t and the separator arms 67 are moved horizontally away from each other to spread the stringer tapes t, t further apart and remove the tape beaded edges t', t' with the top end stops s sidewise from the pockets 36 of the anvil 14 as shown in FIGS. 8 and 9. The anvil 14 then moves with upward stroke of the second cylinder 34 back to the position of FIG. 5 and further moves upwardly together with the horn 15 with upward stroke of the first cylinder 26 back to the original rest position shown in FIG. 2 in which the top end stop applying unit D is retracted away from the horizontal path 21 of the slide fastener chain c. This is followed by advancing movement of the fastener chain c as it is gripped and taken out a predetermined distance by the delivery grippers 17, 18, and thereafter the fastener chain c is severed by the cutters 11, 12 to an individual slide fastener length finished with top end stop attachment. During the delivery of the finished fastener chain c, the step of feeding top end stops s into the pockets 36 of the anvil 14 is underway to maintain a continuous cycle of operation of the apparatus 10.

Designated at 68 in FIGS. 2 and 10 is a detector pin having one of its end secured to the first arm 32a of the anvil holder 32 and the opposite end engageable with a sensor 69 secured to the sliding carrier 25, the arrangement being that if the top end stop s to be clamped between the anvil 14 and the horn 15 is not received in the pocket 36 in either of the two anvils 14 for some reason, the anvil 14 devoid of the end stop s is pushed upwardly by the knock pin 46 of the clamping ram 41 beyond its normal operative position (FIG. 6) relative to the other anvil 14 carrying the end stop s and that consequently the detector pin 68 moves up with the anvil 14 and engages the sensor 69 which in turn provides a control signal to discontinue the operation of the apparatus 10, or alternatively to record the failure so as to apply a "defect" denoting mark on to the fastener chain c that has been cut and delivered out.

Figure 11:
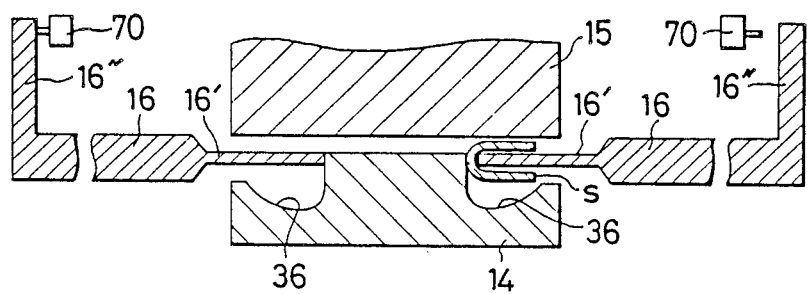
FIG. 11 is a diagrammatic view showing another form of sensor means employed according to the invention.

FIG. 11 shows an alternative detector arrangement in which the plunger 16 has a detector post 16" extending upwardly at an end opposite to the plunger head 16' and engageable with a sensor 70. In this arrangement, if the top end stop forming strip r is, for some reason, not present in the cavity 56 or fails to be arrested by the plunger 16 in the slide member 49, the plunger head 16' moves all way up against the side wall of the central portion 36 of the anvil 14 with the detector post 16" coming into abutting engagement with the sensor 70 which in turn provides a control signal for the purpose already described in connection with the first detector arrangement shown in FIGS. 2 and 10.

Obviously, various modifications and variations of the present invention are possible in the light of the above teaching. It is therefore to be understood that within the scope of the appended claims the invention may be practiced otherwise than as specifically described.

What is claimed is:

1. A method of applying top end stops onto a slide fastener chain of continuous length which comprises the steps of
    (a) forming a top end stop of substantially U-shaped cross-section from an elongate strip of thermoplastic resin;
    (b) receiving and holding said top end stop in between an anvil and a supersonic or high frequency energy applying horn;
    (c) transporting a slide fastener chain along a horizontal path of travel;
    (d) moving said anvil and said horn together into alignment with said horizontal path;
    (e) threading said fastener chain through said top end stop;
    (f) moving said anvil against said horn to clamp said top end stop therebetween;
    (g) attaching said top end stop by fusion to a portion of said fastener chain;
    (h) separating said anvil from said horn and removing said portion of said fastener chain from said anvil for delivery out of said horizontal path; and
    (i) moving said anvil and said horn together out of said horizontal path.

2. An apparatus for applying top end stops on to a slide fastener chain of continuous length which comprises:
    (a) a vertically disposed support frame;
    (b) a sliding carrier movable reciprocably vertically along said frame;
    (c) a supersonic or high frequency energy applying horn secured to and movable with said sliding carrier toward and away from a horizontal path of travel of a slide fastener chain;
    (d) a cylindrical guide carrying therein a spring and extending vertically from said sliding carrier;
    (e) an anvil disposed in confronting relation to and movable with said horn toward and away from said horizontal path in one instance and movable independently from said horn in another instance against the tension of said spring, said anvil having a pocket for receiving therein a top end stop; and
    (f) a clamping ram disposed in confronting relation to said anvil across said horizontal path and adapted to releasably clamp said anvil against said horn.

3. An apparatus according to claim 2 further including a top end stop forming means comprising an upper mold and a lower mold defining therebetween a horizontal cavity for receiving a piece of an elongate strip of thermoplastic resin and a plunger horizontally movable into said cavity to form said piece of strip into a substantially cross-sectionally U-shaped top end stop.

4. An apparatus according to claim 3 further including a sensor operatively associated with said plunger and adapted to detect the absence of said piece of strip in said cavity.

5. An apparatus according to claim 2 wherein said anvil consists of identical halves vertically movable relative to each other.

6. An apparatus according to claim 2 further including a sensor operatively associated with said anvil and adapted to detect the absence of said top end stops in said pocket.

* * * * *